United States Patent
Hirata

(10) Patent No.: US 10,328,482 B2
(45) Date of Patent: Jun. 25, 2019

(54) METHOD FOR MANUFACTURING METAL COMPACT AND APPARATUS FOR MANUFACTURING METAL COMPACT

(71) Applicant: TOYOTA BOSHOKU KABUSHIKI KAISHA, Aichi-ken (JP)

(72) Inventor: Kazuyuki Hirata, Toyota (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 221 days.

(21) Appl. No.: 15/166,544

(22) Filed: May 27, 2016

(65) Prior Publication Data

US 2016/0361751 A1   Dec. 15, 2016

(30) Foreign Application Priority Data

Jun. 9, 2015   (JP) .................................. 2015-116561

(51) Int. Cl.
  *B21D 53/04*   (2006.01)
  *B23P 15/26*   (2006.01)
  *B21D 13/02*   (2006.01)
(52) U.S. Cl.
  CPC .............. *B21D 53/04* (2013.01); *B21D 13/02* (2013.01); *B23P 15/26* (2013.01); *B23P 2700/10* (2013.01)
(58) Field of Classification Search
  CPC ......... B21D 53/04; B21D 13/02; B23P 15/26; B23P 2700/10
  See application file for complete search history.

(56) References Cited

U.S. PATENT DOCUMENTS

2015/0290692 A1* 10/2015 Hirata ................... B21K 23/00
                                                            72/379.6
2015/0359142 A1* 12/2015 Tanaka .................. H01L 23/473
                                                            165/80.3

FOREIGN PATENT DOCUMENTS

| JP | H1051168 | 2/1998 |
| JP | 2012-199324 | 10/2012 |
| JP | WO 2014/175389 | * 10/2014 |

OTHER PUBLICATIONS

Japanese Office Action in counterpart Application No. JP2015-116561, dated Nov. 27, 2018 (along with English-language translation).

* cited by examiner

*Primary Examiner* — Moshe Wilensky
(74) *Attorney, Agent, or Firm* — Greenblum & Bernstein, P.L.C.

(57) ABSTRACT

A heat sink having a base and a projecting portion that extends from the base is manufactured by cold pressing a metal component. In the first process, a preparatory compact is formed by pressing the metal component with a first die including a first die block and a first punch. The preparatory compact has a depression on a surface of the metal component that faces the first punch and a protrusion on a surface of the metal component that faces the first die block. In the second process, by pressing the preparatory compact with the second die including a second punch and a second die block, the depression is crushed and the protrusion is pushed out toward the back of the hole of the second die block to form the projecting portion.

4 Claims, 4 Drawing Sheets

Fig.4A
Fig.4B
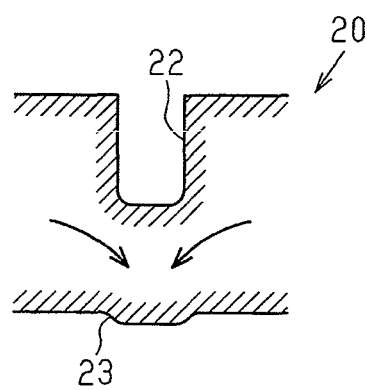
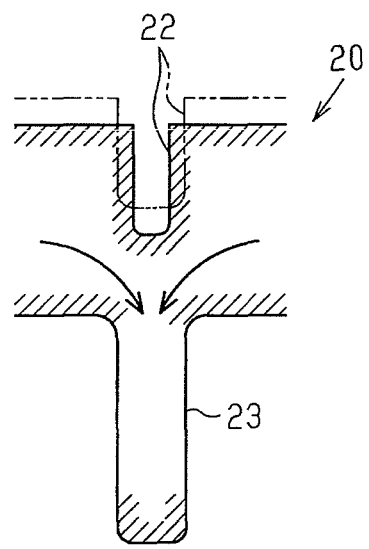

METHOD FOR MANUFACTURING METAL COMPACT AND APPARATUS FOR MANUFACTURING METAL COMPACT

BACKGROUND OF THE INVENTION

The present invention relates to a method and apparatus for manufacturing a metal compact having a base and a projecting portion extending from the hasp by cold pressing a metal component.

Conventional electronic components such as large scale integrated circuits (LSIs) are provided with heat sinks for cooling. A heat sink is made of a metal material with high thermal conductivity such as aluminum and copper and includes a plate-shaped base and fins that project from the base.

In general, such a heat sink is formed by hot pressing (e.g., refer to Japanese Laid-Open Patent Publication No. 2012-199324). The publication discloses a technique of forming pin-shaped fins by heating a metal material, pressing the heated metal material with a die block and a punch, and pressing the metal material into holes of the die block. When a heat sink is manufactured by hot pressing in this way, the metal material, which is heated and softened, is pressed. Thus, the load required for pressing is smaller than the load required for cold pressing.

SUMMARY OF THE INVENTION

When a metal compact, such as a heat sink, having a base and projecting portions extending from the base is manufactured by hot pressing, a heating process for heating a metal material and a cooling process for cooling the metal compact after pressing are needed in addition to the pressing process. Furthermore, heating of the metal material generates oxide scale on the surface of the metal compact after being pressed. Thus, a removing process for removing oxide scale, e.g., by acid pickling and the like may be needed. This increases the number of processes, so that a great amount of time is required for manufacturing the metal compact.

In contrast, a metal compact may be manufactured by cold pressing. In this case, the heating process, the cooling process, and the like are not needed, and the number of processes is decreased. However, in conventional cold pressing, a metal material, which is hard at ordinary temperature, is pressed. Thus, the load required for pressing the metal material is at least a few times larger than that in hot pressing. This causes a problem that the weight tolerance of the die needs to be increased.

It is an objective of the present invention to provide a method and apparatus for manufacturing a metal compact in which the load required for cold pressing is reduced.

A method for manufacturing a metal compact to achieve the objective is a method for manufacturing a metal compact having a base and at least one projecting portion that extends from the base by cold pressing a metal component. The method is characterized by a first process for obtaining a preparatory compact and a second process for forming the at least one projecting portion. In the first process, the metal component is pressed with a first die including a first punch, which has a projection corresponding to the at least one projecting portion, and a first die block, which has a hole corresponding to the projection, so that a depression corresponding to the projection is formed on a surface of the metal component that faces the first punch, and a protrusion corresponding to the hole is formed on a surface of the metal component that faces the first die block. In the second process, the preparatory compact is pressed with a second die including a second punch, which presses a surface including the depression of the preparatory compact formed in the first process, and a second die block, which has a hole corresponding to the depression, so that the depression is crushed, and the protrusion is pushed out toward a back of the hole of the second die block to form the at least one projecting portion.

An apparatus for manufacturing a metal compact to achieve the objective is an apparatus for manufacturing a metal compact having a base and at least one projecting portion that extends from the base by cold pressing a metal component. The apparatus is characterized by a first die including a first punch, which has a projection corresponding to the at least one projecting portion, and a first die block, which has a hole corresponding to the projection, and a second die including a second punch, which presses a surface including the depression of the preparatory compact formed by the first die, and a second die block, which has a hole corresponding to the depression. The first die is used to obtain a preparatory compact by pressing the metal component to form a depression corresponding to the projection on a surface of the metal component that faces the first punch and form a protrusion corresponding to the hole on a surface of the metal component that faces the first die block. With the second die, by pressing the preparatory compact, the depression is crushed and the protrusion is pushed out toward a back of the hole of the second die block to form the at least one projecting portion.

According to the method or the configuration, first, the preparatory compact, which has the depression and the protrusion, is formed by pressing the metal component with a first die (the first process). At this time, the vicinity of the surface of the preparatory compact is work-hardened by pressing the metal component with the first die.

Next, the preparatory compact is pressed with the second die (the second process). At this time, the material has been little work-hardened inside the preparatory compact. Thus, it is easier for the material to flow inside the preparatory compact than in the vicinity of the surface. In other words, the force required for deforming the material inside the preparatory compact is smaller than the force required for deforming the depression, of which the inner circumferential surface is work-hardened, and the protrusion, of which the surface has been work-hardened. When the preparatory compact is pressed, the inside material moves and the body cannot resist its pressure. This reduces the space of the depression and pushes out the protrusion toward the back of the hole of the second die block.

In this way, according to the method or the configuration, in both the first process and the second process, the metal component is cold pressed while the escape route of the metal component is secured in directions different from each other. Thus, the preparatory compact and the metal compact are separately formed. For this reason, the load required for pressing the preparatory compact and the metal compact may be small in comparison with a case in which the metal compact is manufactured by one-time cold pressing, i.e., a case in which an escape route in pressing the metal component is only the hole of the die block for forming a projection portion of the metal compact, and a part of the metal component is forcibly pushed into the hole.

BRIEF DESCRIPTION OF THE DRAWINGS

FIGS. 4A and 4B are schematic cross-sectional views of the structure of the preparatory compact to show operation of the embodiment.

DETAILED DESCRIPTION OF THE INVENTION

One embodiment will now be described with reference to FIGS. 1 to 3A, 3B, and 3C. In the present embodiment, an apparatus and a method for manufacturing a heat sink 10 used for cooling electronic components will be described.

Figure 1:
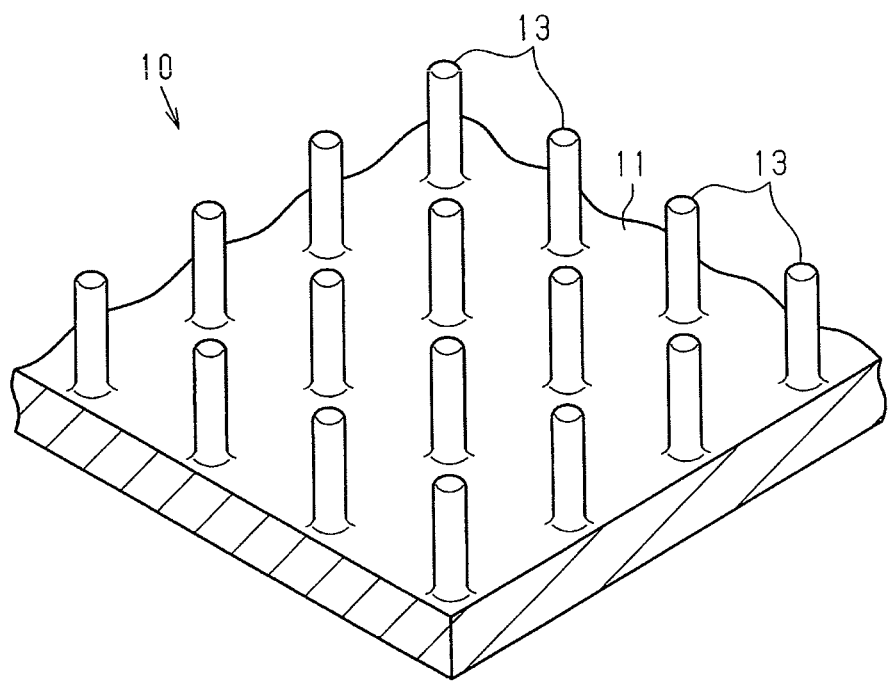
FIG. 1 is a perspective view of a part of a heat sink manufactured by a method for manufacturing a metal compact according to one embodiment.

As shown in FIG. 1, the heat sink 10 includes a plate-shaped base 11 and columnar projecting portions 13, which extend from the top surface of the base 11. The projection amount of each projecting portion 13 is greater than the plate thickness of the base 11. The heat sink 10 is made of, e.g., a metal material with high thermal conductivity such as aluminum.

The apparatus for manufacturing the heat sink 10 will now be described. The apparatus includes a first die 40 shown in FIGS. 2A, 2B, and 2C and a second die 50 shown in FIGS. 3A, 3B, and 3C.

Figure 2A:
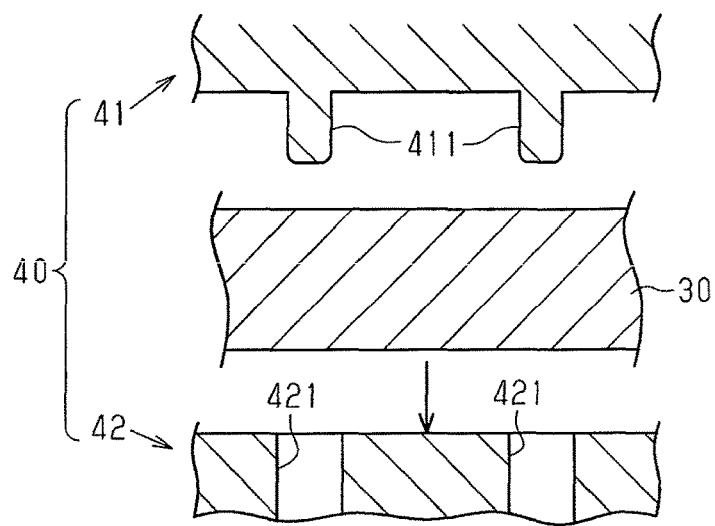
FIGS. 2A to 2C are cross-sectional views of a metal component, which is deformed to a preparatory compact, showing states of deformation in order in a first process according to the embodiment.

As shown in FIG. 2A, the first die 40 includes a first die block 42 and a first punch 41. The first die block 42 includes holes 421 that are arranged to correspond to the projecting portions 13 of the heat sink 10. The first punch 41 includes projections 411 that are arranged to correspond to the holes 421. Each hole 421 includes a columnar space.

Figure 3A:
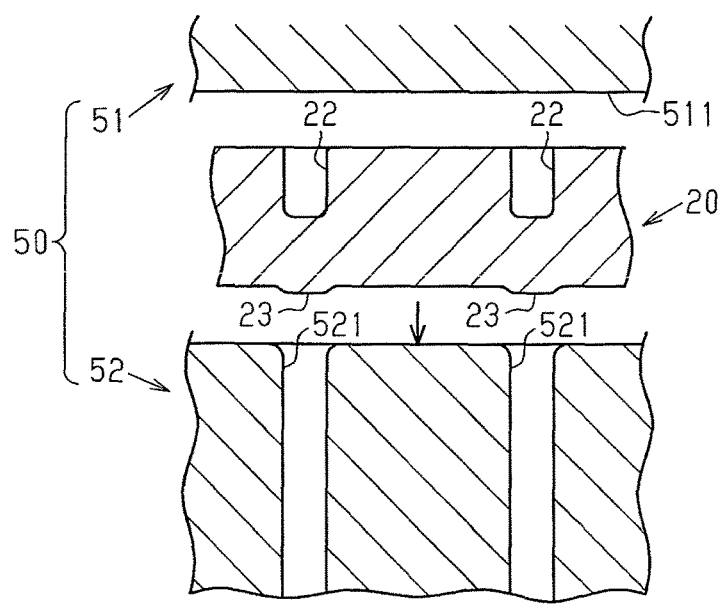
FIGS. 3A to 3C are cross-sectional views of a preparatory compact, which is deformed to a heat sink, showing states of deformation in order in a second process according to the embodiment.

As shown in FIG. 3A, the second die 50 includes a second die block 52 and a second punch 51. The second die block 52 includes holes 521 that are arranged to correspond to the projecting portions 13 of the heat sink 10. The second punch 51 includes a flat bottom surface 511. Each hole 521 includes a columnar space. In short, the holes 421 of the first die block 42 correspond to the projections 411 of the first punch 41, and the holes 521 of the second die block 52 correspond to the projecting portions 13 of the heat sink 10.

Procedure for manufacturing the heat sink 10 and operation of the present embodiment will now be described.

First, as shown in FIG. 2A, a plate-shaped metal component 30 such as aluminum is placed on the top surface of the first die block 42. The plate thickness of the metal component 30 is less than the projection amounts of the projecting portions 13 of the heat sink 10.

Figure 2B:
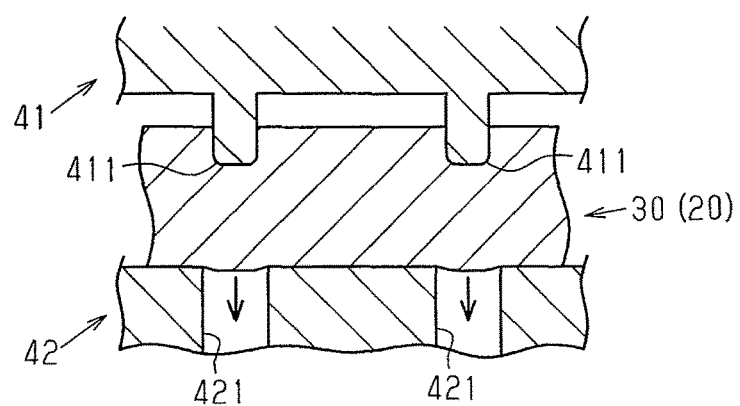
Figure 2C:
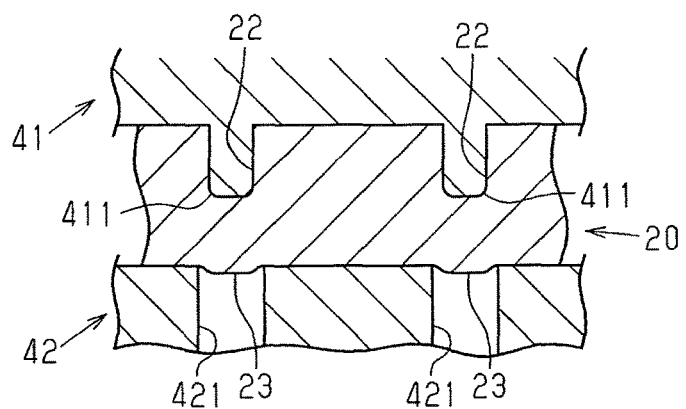

Second, as shown in FIGS. 2B and 2C, the first punch 41 is lowered so that the first die block 42 and the first punch 41 press the metal component 30. This forms depressions 22, which correspond to the projections 411, on a surface of the metal component 30 that faces the first punch 41. At the same time, protrusions 23, which correspond to the holes 421, are formed on a surface of the metal component 30 that faces the first die block 42. Thus, a preparatory compact 20 is formed (a first process).

Next, as shown in FIG. 3A, the preparatory compact 20 is placed on the top surface of the second die block 52 such that the protrusions 23 of the preparatory compact 20 coincide with the respective holes 521.

Figure 3B:
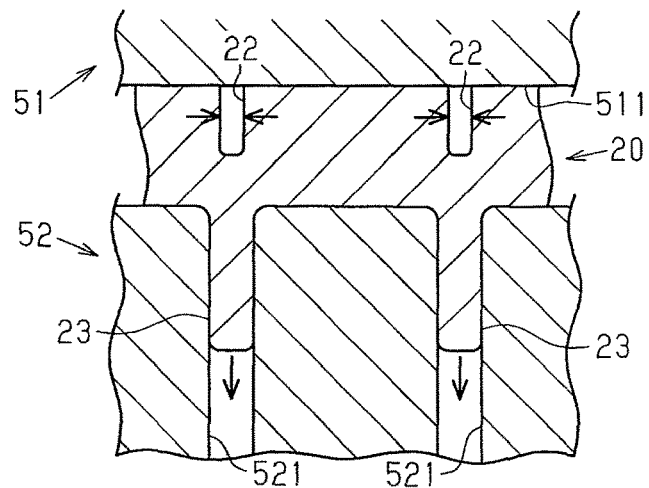
Figure 3C:
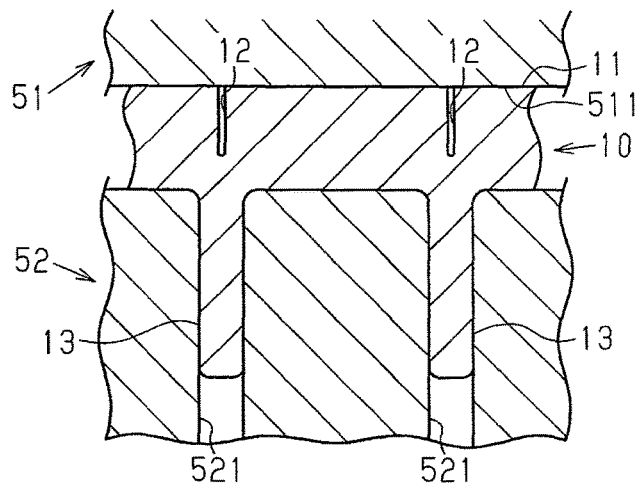

Then, as shown in FIGS. 3B and 3C, the second punch 51 is lowered so that the second die block 52 and the second punch 51 press the preparatory compact 20. This crushes the depressions 22 and pushes out the protrusions 23 toward the second die block 52 to form the projecting portions 13. Thus, the heat sink 10 is shaped (a second process).

With this method, the first die 40 presses the metal component 30, so that the vicinity of the surface (the meshed portions in FIG. 4A) of the preparatory compact 20 is work-hardened as shown in FIG. 4A.

After that, when the second die 50 presses the preparatory compact 20, as shown in FIGS. 4A and 4B, since the material has been little work-hardened inside the preparatory compact 20, it is easier for the material to flow inside the preparatory compact 20 than in the vicinity of the surface. In other words, a force A required for deforming the material inside the preparatory compact 20 is less than a force B required for deforming the depressions 22, which include the work-hardened inner circumferential surface, and the protrusions 23, which include the work-hardened surface (A<B). Thus, when the preparatory compact 20 is pressed, the inside material moves along the arrows of FIGS. 4A and 4B and cannot resist its pressure. This decreases the space of the depressions 22 and pushes out the protrusions 23 toward the backs of the holes 521 of the second die block 52.

Thus, in the present embodiment, in both the first process and the second process, the metal component 30 is cold pressed while the escape route of the metal component 30 is secured in directions different from each other. Thus, the preparatory compact 20 and the heat sink 10 are separately formed. For this reason, the load required for pressing the preparatory compact 20 and the heat sink 10 may be small in comparison with a case in which the heat sink 10 is manufactured by one-time cold pressing, i.e., a case in which an escape route in deforming the metal component 30 is only the holes of the die block for forming the projecting portions 13 of the heat sink 10 and the metal component 30 is forcibly pressed into the holes.

In the manufacturing method according to the present embodiment, the surfaces of the protrusions 23 are work-hardened in the first process. Thus, when the protrusions 23 are pushed out toward the backs of the holes 521 of the second die block 52 in the second process, the surface shapes of the protrusions 23 are likely to be maintained. Therefore, a burr is not easily created on the projecting portions 13 of the heat sink 10.

The above-illustrated method and apparatus for manufacturing a metal compact according to the present embodiment achieve the following advantages.

(1) The first die 40 presses the metal component 30 to form the depressions 22 on the surface of the metal component 30 that faces the first punch 41 and form the protrusions 23 on the surface of the metal component 30 that faces the first die block 42. Thus, the preparatory compact 20 is obtained (the first process). In the second process, the second die 50 presses the preparatory compact 20 to crush the depressions 22 and push out the protrusions 23 toward the second die block 52 to form the projecting portions 13.

According to such a method, the load required for pressing the preparatory compact 20 and the heat sink 10 is small in comparison with a case in which the heat sink 10 is manufactured by one-time cold pressing. Thus, the load required for cold pressing is decreased.

With such a method, it is easy to change the projection amounts of the projecting portions 13 of the heat sink 10, which are formed in the second process, by properly changing the shapes of the depressions 22 and the protrusions 23, which are formed in the first process.

(2) Since the surfaces of the protrusions 23 are work-hardened in the first process, the surface shapes of the protrusions 23 are likely to be maintained in pushing out the protrusions 23 toward the backs of the holes 521 of the second die block 52 in the second process. Thus, a burr is not easily created on the projecting portions 13 of the heat sink 10.

(3) Crush holes 12 formed by crushing the depressions 22 remain on the back surface of the base 11 of the heat sink 10, i.e., the surface opposite to the surface including the projecting portions 13. Thus, for example, when an electronic component, to which the heat sink 10 is attached, is deformed with heat, the base 11 is easily deformed together.

(4) In the second process, the preparatory compact 20 is pressed until the projection amounts of the projecting portions 13 become greater than the plate thickness of the base 11.

Such a method increases the surface area of the projecting portions 13 and increases the surface area of the heat sink 10. Thus, it is possible to manufacture the heat sink 10 with great heat dissipation. In addition, the load required for cold pressing is decreased in manufacturing the heat sink 10 in which the projection amounts of the projecting portions 13 are greater than the plate thickness of the base 11.

(5) The apparatus for manufacturing the heat sink 10 includes the first die 40. The first die 40 includes the first punch 41 including the projections 411 and the first die block 42 including the holes 421. By pressing the metal component 30, the depressions 22 are formed on the surface of the metal component 30 that faces the first punch 41, and the protrusions 23 are formed on the surface of the metal component 30 that faces the first die block 42. Thus, the preparatory compact 20 is obtained. In addition, the apparatus includes the second die 50. The second die 50 includes the second punch 51, which presses the surface on which the depressions 22 of the preparatory compact 20 are formed, and the second die block 52 including the holes 521. The depressions 22 are crushed by pressing the preparatory compact 20. The projecting portions 13 are formed by pushing out the protrusions 23 toward the backs of the holes 521 of the second die block 52.

According to such a configuration, an advantage corresponding to the above advantage (1) is achieved.

MODIFICATIONS

The above-illustrated embodiment may be modified in the following forms, for example.

The heat sink 10 may be made of a metal material (including alloy) other than aluminum, such as copper, an aluminum alloy, and a copper alloy.

Each hole 421 of the first die block 42 may have a polygonal prism-shaped space. Each hole 521 of the second die block 52 may have a polygonal prism-shaped space.

The projection amounts of the projecting portions 13 of the heat sink 10 may be set the same as or less than the plate thickness of the base 11.

The metal compact is not limited to the heat sink 10. Other than the heat sink 10, for example, a gas flow passage forming member, which forms a gas flow passage that constitutes a solid oxide fuel cell (SOFC), may be formed by the method and apparatus the same as the above-illustrated embodiment. In this case, the gas flow passage forming member may be made of, e.g., stainless steel and the like.

The number of the projecting portions 13 may be one.

The invention claimed is:

1. A method for manufacturing a metal compact having a base and at least one projecting portion that extends from the base by cold pressing a metal component, the method comprising:
   a first process for obtaining a preparatory compact, in which the metal component is pressed with a first die including a first punch, which has a projection corresponding to the at least one projecting portion, and a first die block, which has a hole corresponding to the projection, so that a depression corresponding to the projection is formed on a surface of the metal component that faces the first punch, and a protrusion corresponding to the hole is formed on a surface of the metal component that faces the first die block; and
   a second process for forming the at least one projecting portion, in which the preparatory compact is pressed with a second die including a second punch having a planar face with no projections, which presses a surface including the depression of the preparatory compact formed in the first process, and a second die block, which has a hole corresponding to the depression, so that the depression is crushed, and the protrusion is pushed out toward a back of the hole of the second die block to form the at least one projecting portion.

2. The method for manufacturing a metal compact according to claim 1, wherein the second process includes pressing the preparatory compact until a projection amount of the projecting portion is greater than a plate thickness of the base.

3. The method for manufacturing a metal compact according to claim 1, wherein:
   the metal compact is a heat sink,
   the at least one projecting portion is one of a plurality of projecting portions, and
   the heat sink includes the projecting portions.

4. The method for manufacturing a metal compact according to claim 1, wherein:
   the metal compact is a gas flow passage forming member, which forms a gas flow passage of a fuel cell,
   the at least one projecting portion is one of a plurality of projecting portions, and
   the gas flow passage forming member includes the projecting portions.

* * * * *